(12) United States Patent
Gray et al.

(10) Patent No.: US 11,857,975 B2
(45) Date of Patent: Jan. 2, 2024

(54) SYSTEM FOR HANDLING SLIDES

(71) Applicant: Mikroscan Technologies Inc., Carlsbad, CA (US)

(72) Inventors: Jeffrey Ross Gray, San Diego, CA (US); James Clail Crowe, Carlsbad, CA (US)

(73) Assignee: Mikroscan Technologies, Carlsbad, CA (US)

( * ) Notice: Subject to any disclaimer, the term of this patent is extended or adjusted under 35 U.S.C. 154(b) by 0 days.

(21) Appl. No.: 17/851,424

(22) Filed: Jun. 28, 2022

(65) Prior Publication Data

US 2022/0323965 A1   Oct. 13, 2022

Related U.S. Application Data

(62) Division of application No. 16/785,496, filed on Feb. 7, 2020, now Pat. No. 11,465,151.

(51) Int. Cl.
| | |
|---|---|
| *G01N 1/00* | (2006.01) |
| *B01L 9/00* | (2006.01) |
| *G02B 21/34* | (2006.01) |
| *G02B 21/26* | (2006.01) |
| *G01N 35/00* | (2006.01) |

(52) U.S. Cl.
CPC .......... *B01L 9/52* (2013.01); *G01N 35/00029* (2013.01); *G02B 21/26* (2013.01); *G02B 21/34* (2013.01); *B01L 2300/0822* (2013.01); *G01N 2035/00039* (2013.01); *G01N 2035/00138* (2013.01)

(58) Field of Classification Search
None
See application file for complete search history.

(56) References Cited

U.S. PATENT DOCUMENTS 6,152,868 A * 11/2000 Walters ................ B04B 5/0414
494/19

* cited by examiner

*Primary Examiner* — Jyoti Nagpaul

(57) ABSTRACT

The present disclosure provides a system for handling slides. The system includes a carrier having a linear engagement feature and a notch, a cartridge having a compartment configured to accept the carrier, and a cartridge positioning system with a platform configured to accept the cartridge and an actuator. The actuator has a rotary engagement feature configured to engage the linear engagement feature and a tab configured to interact with the notch when the carrier is accepted into the compartment and the cartridge is accepted onto the platform.

7 Claims, 9 Drawing Sheets

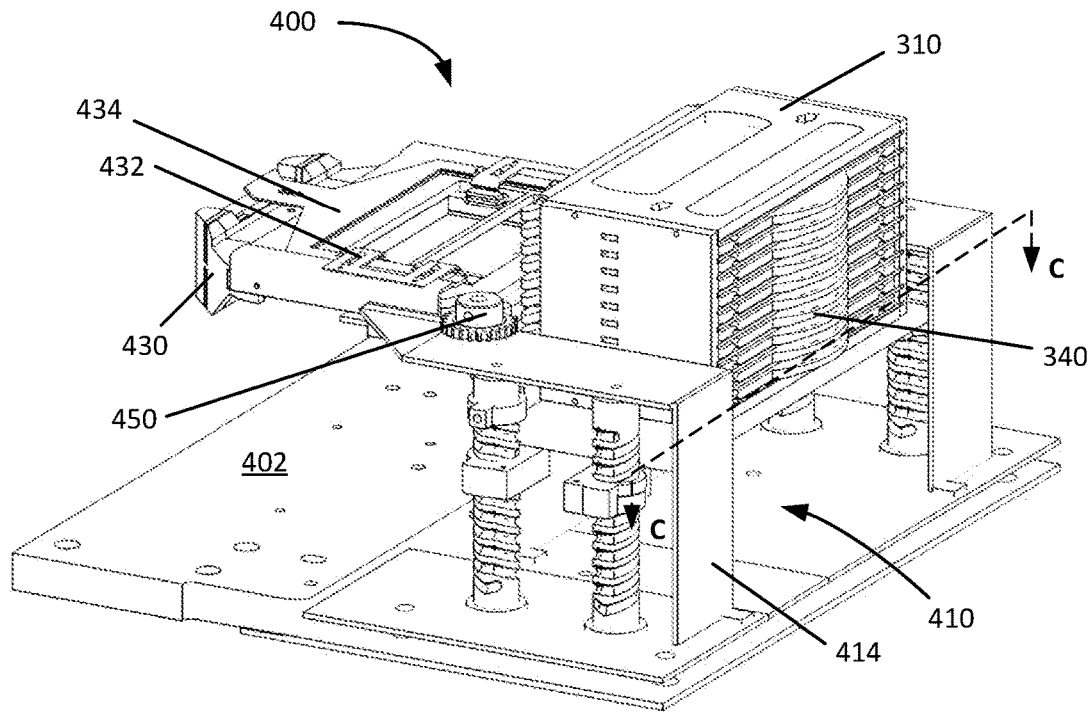
FIG. 4
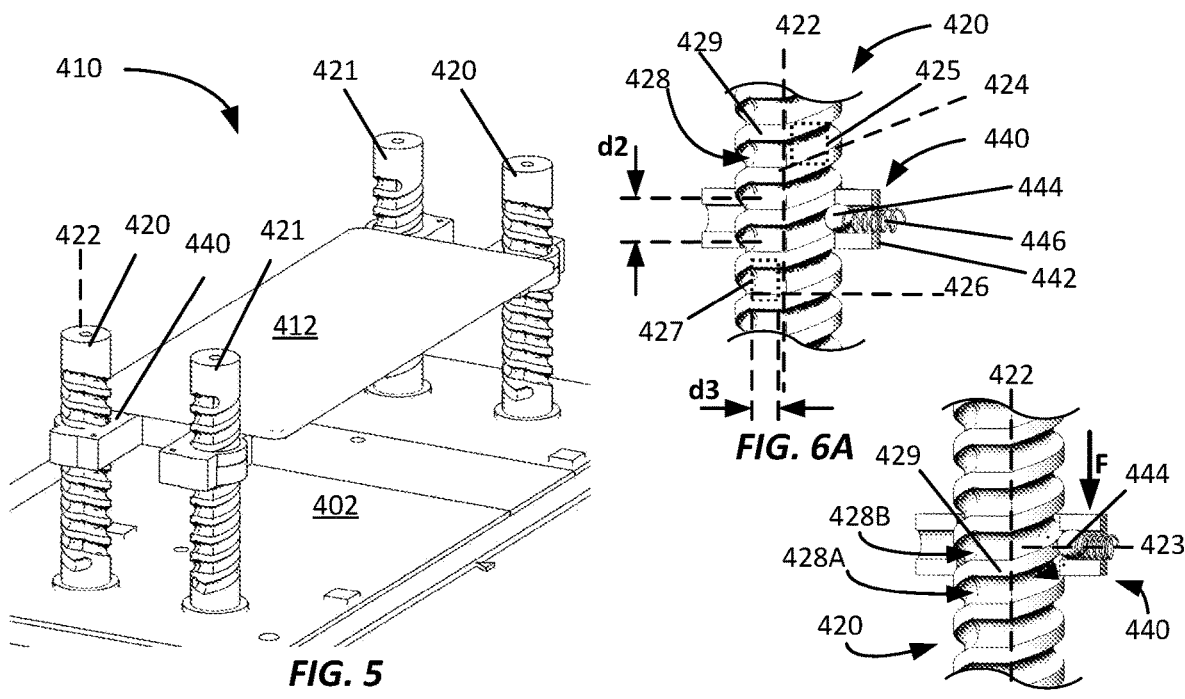
FIG. 5
FIG. 6A
FIG. 6B (B-B from Fig. 4)

(E-E from Fig. 10A, first configuration)

(E-E from Fig. 10A, second configuration)

(G from Fig. 10B)

(H from Fig. 10C)

(A-A from Fig. 3A)
Side View
all carriers fully inserted (B-B from Fig. 3A)
Front View
all carriers fully inserted (A-A from Fig. 3A)
Side View
one carrier partially withdrawn (A-A from Fig. 3A)
Side View
one carrier fully withdrawn (A-A from Fig. 3A)
Side View
carriers locked in place

SYSTEM FOR HANDLING SLIDES

CROSS-REFERENCE TO RELATED APPLICATIONS

This Divisional application claims the benefit of U.S. application Ser. No. 16/785,496 filed on Feb. 7, 2020, which is hereby incorporated herein in its entirety.

FIELD

The present disclosure provides apparatus and methods for handling slides in conjunction with an automated optical imaging system.

DESCRIPTION OF THE RELATED ART

The current approach to loading slides into an automated examination system requires an operator to manually insert a carrier that holds one or more slides into a mount, allow the system to examine the slides, then manually swap that carrier with another carrier holding the next set of slides. This is time consuming and an inefficient use of an operator time.

SUMMARY

In an aspect, the present disclosure provides for, and includes, a system comprising a carrier that comprises a retention hole and a cartridge. The cartridge comprises a case coupled to one or more separators that together define a plurality of compartments each having a guide hole and configured to accept the carrier. All guide holes are disposed on a first axis. The retention hole of the carrier is aligned with the first axis when the carrier is disposed in a seated position within one of the compartments. The cartridge also comprises a plurality of spacers each partially disposed within at least one of the guide holes.

In an aspect, the present disclosure provides for, and includes, a system for handling slides that comprises a carrier having a linear engagement feature and a notch, a cartridge having a compartment configured to accept the carrier, and a cartridge positioning system that has a structure, a platform movable coupled to the structure and configured to accept the cartridge, and an actuator movably coupled to the structure. The actuator comprises a rotary engagement feature configured to engage the linear engagement feature and a tab configured to interact with the notch when the carrier is accepted into the compartment and the carrier is accepted onto the platform. Operation of the actuator in a first direction removes the carrier from the compartment and operation of the actuator in a second direction opposite to the first direction inserts the carrier into the compartment.

In an aspect, the present disclosure provides for, and includes, a cartridge positioning system for positioning a cartridge. The system comprises a drive rod comprising a body having a first axis and a groove formed in the body. The groove has a first portion that is not perpendicular to the first axis and a second portion that is perpendicular to the first axis. The system also comprises a collar coupled to the drive rod. The collar has an element configured to engage the groove. Rotation of the drive rod with respect to the collar while the element is engaged in the first portion of the thread causes the collar to move with respect to the drive rod along the first axis. Rotation of the drive rod with respect to the collar while the element is engaged with the second portion of the thread causes the collar to remain stationary with respect to the drive rod along the first axis.

In an aspect, the present disclosure provides for, and includes, a drive rod for moving an element. The drive rod comprises a body having a first axis and a groove formed into the body. The groove has a first portion that is not perpendicular to the first axis and a second portion that is perpendicular to the first axis. Rotation of the drive rod with respect to the collar while the element is engaged in the first portion of the thread causes the collar to move with respect to the drive rod along the first axis. Rotation of the drive rod with respect to the collar while the element is engaged with the second portion of the thread causes the collar to remain stationary with respect to the drive rod along the first axis.

In an aspect, the present disclosure provides for, and includes, a system for handling a slide. The system comprises a carrier comprising a retention hole, wherein the carrier is configured to accept the slide. The system also comprises a cartridge comprising a case coupled to one or more separators that together define a plurality of compartments each configured to accept the carrier. At least one of the separators comprises a guide hole. All guide holes are disposed on a first axis. The carrier is disposed in a seated position within one of the compartments of the cartridge when the retention hole is aligned with the first axis. The cartridge also comprises a plurality of spacers each partially disposed within at least one of the guide holes.

In an aspect, the present disclosure provides for, and includes, a cartridge for handling a carrier having a retention hole. The cartridge comprises a case and one or more separators coupled to the case so as to define a plurality of compartments configured to accept the carrier. At least one of the separators comprises a guide hole. All guide holes are disposed on a first axis. The carrier is disposed in a seated position within one of the compartments of the cartridge when the retention hole is aligned with the first axis. The cartridge also comprises a plurality of spacers each partially disposed within at least one of the guide holes.

In an aspect, the present disclosure provides for, and includes, a carrier for use in a slide handling system having an actuator. The carrier comprises a body having a notch formed in the body and a linear engagement feature formed along an edge of the body. The linear engagement feature and the notch are configured to engage with the actuator so that the actuator may move the carrier.

BRIEF DESCRIPTION OF THE DRAWINGS

Aspects of the disclosure are herein described, by way of example only, with reference to the accompanying drawings. With specific reference now to the drawings in detail, it is stressed that the particulars shown are by way of example and are for purposes of illustrative discussion of aspects of the disclosure. In this regard, the description and the drawings, considered alone and together, make apparent to those skilled in the art how aspects of the disclosure may be practiced.

FIG. 4 depicts an exemplary slide handling system, according to the present disclosure.

FIGS. 5, 6A, and 6B depict an exemplary cartridge positioning system, according to the present disclosure.

DETAILED DESCRIPTION

Figure 1:
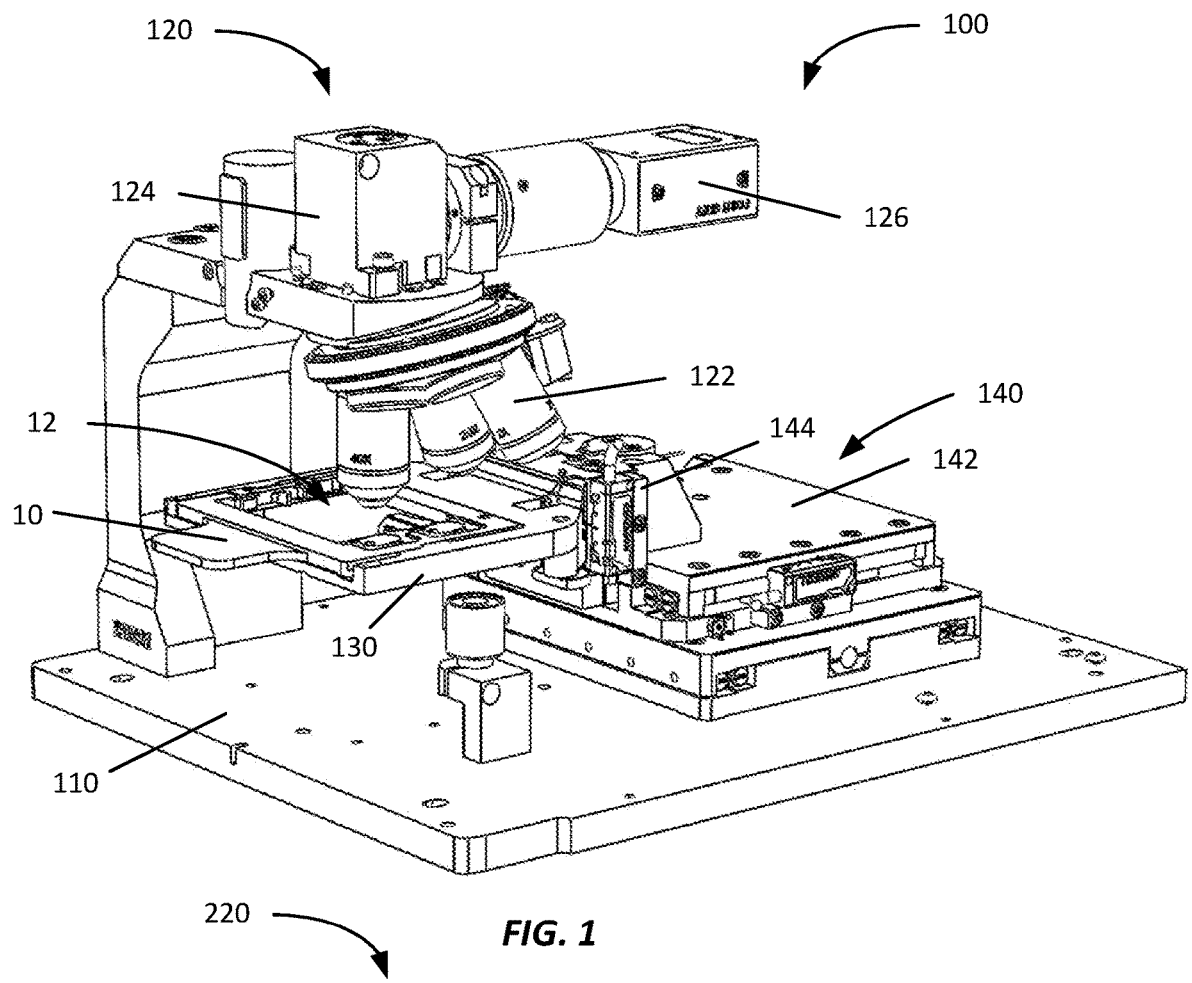
FIG. 1 is a perspective view of an example slide examination system.

The present disclosure describes apparatus and methods related to automating the sequential loading and unloading of multiple carriers, thereby extending the duration of autonomous operation of an automated examination system. These same concepts and principles may be applied to other fields and apparatus that can benefit from the positioning and handling features disclosed herein.

This description is not intended to be a detailed catalog of all the different ways in which the disclosure may be implemented, or all the features that may be added to the instant disclosure. For example, features illustrated with respect to one embodiment may be incorporated into other embodiments, and features illustrated with respect to a particular embodiment may be deleted from that embodiment. Thus, the disclosure contemplates that in some embodiments of the disclosure, any feature or combination of features set forth herein can be excluded or omitted. In addition, numerous variations and additions to the various embodiments suggested herein will be apparent to those skilled in the art in light of the instant disclosure, which do not depart from the instant disclosure. In other instances, well-known structures, interfaces, and processes have not been shown in detail in order not to unnecessarily obscure the invention. It is intended that no part of this specification be construed to effect a disavowal of any part of the full scope of the invention. Hence, the following descriptions are intended to illustrate some particular embodiments of the disclosure, and not to exhaustively specify all permutations, combinations and variations thereof.

Unless otherwise defined, all technical and scientific terms used herein have the same meaning as commonly understood by one of ordinary skill in the art to which this disclosure belongs. The terminology used in the description of the disclosure herein is for the purpose of describing particular aspects or embodiments only and is not intended to be limiting of the disclosure.

References to techniques employed herein are intended to refer to the techniques as commonly understood in the art, including variations on those techniques or substitutions of equivalent techniques that would be apparent to one of skill in the art. Concepts and designs known to those of ordinary skill in the art may be referenced herein but are not described in detail.

Unless the context indicates otherwise, it is specifically intended that the various features of the disclosure described herein can be used in any combination. Moreover, the present disclosure also contemplates that in some embodiments of the disclosure, any feature or combination of features set forth herein can be excluded or omitted.

The methods disclosed herein include and comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

As used in the description of the disclosure and the appended claims, the singular forms "a," "an" and "the" are intended to include the plural forms as well, unless the context clearly indicates otherwise.

As used herein, "and/or" and "or" refer to and encompass any and all possible combinations of one or more of the associated listed items.

The terms "about" and "approximately" as used herein when referring to a measurable value, such as a length, is meant to encompass variations of ±20%, ±10%, ±5%, ±1%, ±0.5%, or even ±0.1% of the specified amount, and when referring to a condition, such as proximity, its meant to be encompass a range of values similar in magnitude, for example from 0% to 200%, 0% to 100%, 0% to 50%, or even 0% to 10%, of a characteristic, such as a diameter, of the referenced object.

As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y."

As used herein, a "system" may be a collection of devices that are physical coupled or separated while in wired or wireless communication with each other.

As used herein, "optical" refers to a range of wavelengths of radiation that, in certain embodiments, comprises the "visible" spectrum of 380 to 740 nanometers (nm). In certain embodiments, this range may comprise a portion of the infrared spectrum above 740 nm. In certain embodiments, this range may comprise a portion of the ultraviolet spectrum below 380 nm.

As used herein, "imaging system" refers to a system that comprises one or more of an image-forming element, a filtering element, an image-detecting element, an image-conversion element that converts an optical image into an analog or digital representation of the image, an element for converting the representation into data, a data processing capability, a data transmission capability, and/or a data storage capability.

As used herein, "hole" refers to a void that passes partially or completely through an object. The hole may be uniform in profile along the depth of the hole or have a profile that varies along the depth. The profile of a hole may be geometric shape, for example a circle or oval or square, or an arbitrary shape defined by a closed line.

As used herein, a "slide" refers to a sample substrate that carries a substance or object to be examined. A slide may be made of any material, for example glass or plastic or ceramic or metal, and have any geometric form, for example a planar rectangle of uniform thickness.

As used herein, "camera" refers to a detection system that is sensitive to a portion of the optical energy provided to the camera, for example an optical image formed on an element of the camera. A camera may include elements to provide an output in optical or electronic form that is associated with an attribute of the optical energy.

As used herein, a "spring element" may be a single item or multi-element assembly that provides an elastic forcedisplacement characteristic. For example, a spring may be provided as a piece of elastic foam or a metal cantilever or helical coil or a sealed container containing a compressible fluid.

FIG. 1 is a perspective view of an example slide examination system 100. The system 100 typically has a base 110 on which is mounted an imaging system 120, which may include a magnification system 122, an optical system 124, and a camera 126. This system 100 has a manual slide carrier 10 that is configured to accept two slides in the slide mounting area 12. The system 100 also includes a carrier mount 130, wherein for example the manual carrier 10 can be slid laterally into the mount 130. The mount 130 is attached to a slide positioning system 140 that includes a lateral positioning stage 142 and a vertical positioning stage 144. The slide positioning system 140 is configured to selectably place a portion of a slide that is accepted into the carrier under the magnification system 122.

Figure 2:
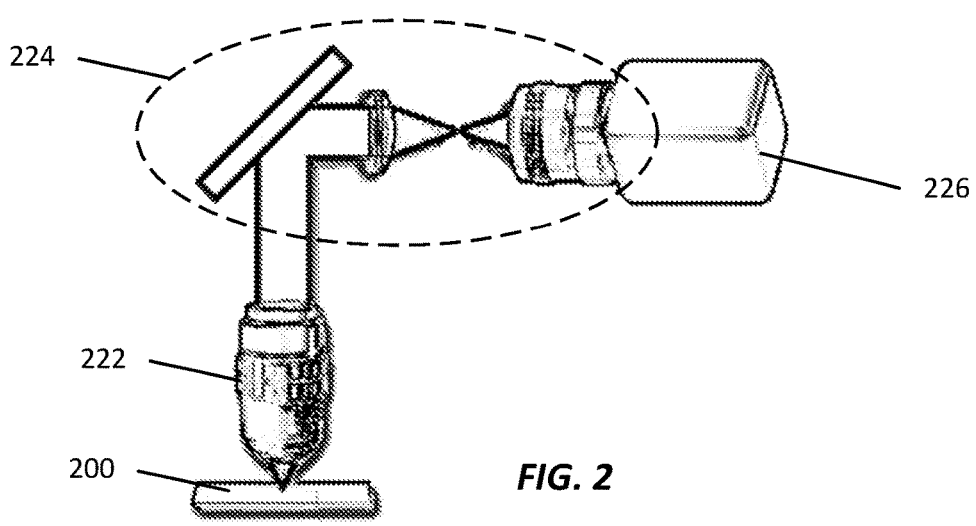
FIG. 2 is a schematic representation of the imaging system of the slide examination system of FIG. 1.

FIG. 2 is a schematic representation of the imaging system 120 of the slide examination system 100 of FIG. 1. The magnification system 122 and the optical system 124 cooperate to form an optical image of an object (not visible in FIG. 2) on the surface of the slide 200 on a sensitive portion of the camera 226.

Figure 3A:
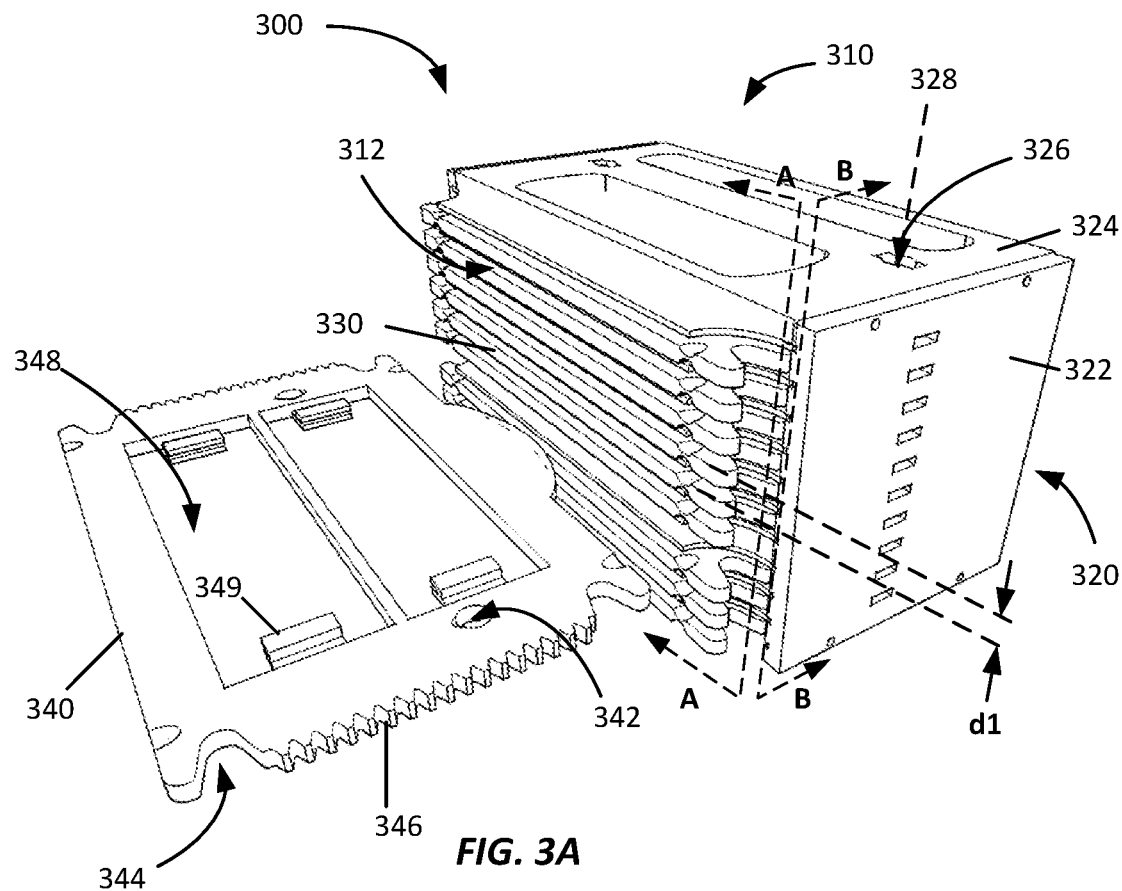
FIGS. 3A-3B depict an exemplary slide transport system, according to the present disclosure.
Figure 3B:
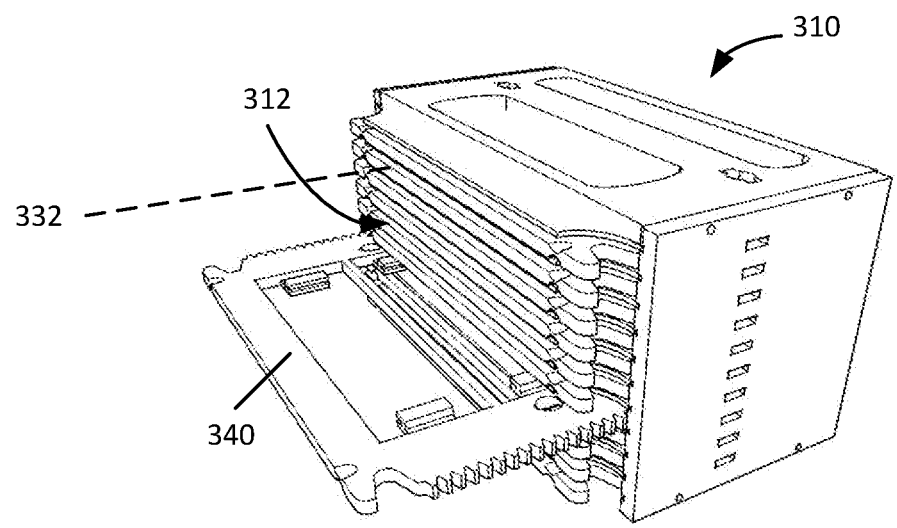

FIGS. 3A-3B depict an exemplary slide transport system 300, according to the present disclosure. The system 300 comprises a carrier 340 and a cartridge 310.

The exemplary carrier 340 shown in FIG. 3A has a body configured to accept a slide (not shown in FIG. 3A), for example slide 200 of FIG. 1, in the slide mounting area 348. Tabs 349 are configured to couple to a slide, which are discussed further with respect to FIGS. 10A-10C. Carrier 340 also comprises a notch 344 in the body and linear engagement feature 346 formed along an edge of the body, which are discussed further with respect to FIGS. 8A-8G. In certain embodiments, the linear engagement feature comprises gear teeth. In certain embodiments, the gear teeth have a pitch in the range of 2-20 teeth per inch, 3-10 teeth per inch, 4-8 teeth per inch, or 5-6 teeth per inch. Carrier 340 also comprises a retention hole 342 through the body, which is discussed further with respect to FIGS. 12A-12F.

The exemplary cartridge 310 comprises a top plate 324, two side plates 322, a bottom plate (not visible in FIG. 3A) that is opposite the top plate 324, and one or more separators 330 that together define a plurality of compartments 312 each configured to accept a carrier 340. The top plate 326 has a guide hole 326. A portion of the separators 330 also have a guide hole (not visible in FIG. 3A) that is aligned with the guide hole 326 along a linear axis 328. In certain embodiments, all of the separators 330 comprise a guide hole. In certain embodiments, the axis 328 is aligned perpendicular to the top surface of the top plate 324. In certain embodiments, the axis 328 is aligned perpendicular to the top surface of the bottom plate.

In certain embodiments, the compartments 312 are of a common configuration and have a "pitch," or separation distance, of d1, as shown in FIG. 3A. This can be considered to be a center-to-center distance or the distance between corresponding features, for example the surface of the separators 330 that forms the lower side of adjacent compartments 312. A compartment 312 also has a height, being the open distance between the upper surface of the lower separator 330 and the lower surface of the upper separator 330. This height plus the thickness of the separators 330 equals the pitch of the compartments.

FIG. 3B depicts a carrier 340 partially disposed in a compartment 312 of cartridge 310. The carrier 340 moves parallel to an axis 332 as the carrier 340 is inserted into or removed from a compartment 312. Whether the carrier 340 is "partially" inserted/withdrawn or "fully" inserted/withdrawn is discussed with respect to FIGS. 12C-12D.

FIG. 4 depicts an exemplary slide handling system 400, according to the present disclosure. The slide handling system 400 comprises a cartridge 310 that is coupled to a cartridge positioning system 410 attached to a base 402. In this example, the cartridge 310 contains a plurality of carriers 340. A carrier mount 430 is attached to a slide examination system 100 (not shown in FIG. 4 for clarity) that is also coupled to the base 402.

The cartridge positioning system 410 further comprises a structure 414 and an actuator 450 coupled to the structure and positioned proximate to the installed cartridge 310. The operation of the actuator 450 is discussed further with respect to FIGS. 8A-8G. The carrier mount 430 comprises slide clamp 432 and a finger-actuation slide 434, which are discussed in further detail with respect to FIGS. 11A-11B.

FIG. 5 depicts a portion of the exemplary cartridge positioning system 410, according to the present disclosure. The structure 414 and other details have been omitted for clarity. The system 410 comprises a platform 412 that is configured to accept and fixedly retain a cartridge 310, with a further ability to selectably release the cartridge 310. The system 410 further comprises at least one collar 440 coupled to the platform 412 and at least one drive rod 420, 421 coupled to base 402. In the example of FIG. 5, there are four collars 440.

Within the system 410, each collar 440 is further coupled to a drive rod 420, which is threaded in a first spiral direction, or a drive rod 421, which is threaded in a second spiral direction that is opposite to the first spiral direction. Each drive rod 420, 421 has an axis 422. Rotating drive rods 420 in a clockwise (as seen from above in the orientation shown in FIG. 5) direction will cause the associated collar 440 to move downward along the axis 422. Rotating drive rods 421 in a clockwise direction will cause the associated collar 440 to move upward along the axis 422. When the set of drive rods 420, 421 are simultaneously rotated in the appropriate directions, for example rotating drive rods 420 clockwise while rotating drive rods 421 counterclockwise, the platform will move parallel to axis 422 and the torques applied by the drive rods 420, 421 to the platform 412 are balanced, i.e. sum to approximately zero. In certain embodiments, the drive rods 420, 421 are coupled together to rotate in appropriate directions at a common rotational rate.

FIG. 6A is an enlarged view of a portion of drive rod 420 and collar 440. The drive rod 420 comprises one or more grooves 428 formed as a spiral around the first axis of the drive rod. Adjacent grooves 428, whether portions of a single groove 428 or multiple parallel grooves 428, are separately by a separation ridge 429. A groove 428 comprises a first portion 425 having an angle, indicated by line 424, to the first axis 422. Groove 428 also comprise a second portion 427 that is perpendicular, indicated by line 426, to the first axis 422. Portion 427 has a width d3, as shown in FIG. 6A. The width d3, in combination with the inner diameter of the groove 428, determines a range of angular position of drive rod 420 within which the collar 440 does not move with respect to the drive rod 420 along the axis 422. This range reduces the sensitivity of the vertical position of platform 412 to the angular position of the drive rods 420. The groove 428 may have a variety of profiles, for example circular or square or triangular. The profile of the separation ridge may also have a variety of profiles, for example flat-topped or rounded or a sharp peak.

In certain embodiments, the groove 428 has a pitch of d2, as shown in FIG. 6A. In this example, the drive rod 420 has a single groove 428 formed in spiral such that adjacent grooves are the same groove 428. If d2 is equal to d1 of FIG. 3A, which is the pitch of the compartments 312, then each full rotation of the drive rods 420 incrementally moves the platform 412 upward, or downward, by one compartment 312. In certain embodiments, d2 is equal to other integral multiples of d1, wherein that multiple of rotations of the drive rods 420 will incrementally move the platform 412 by one compartment.

Collar 440 is coupled to the drive rod 420 by housing 442, which encircles drive rod 420 in this example, and an element 444 that is configured to engage the groove 428 of the drive rod 420. In this example, groove 428 is formed with a circular profile while the element 444 is a sphere, thereby providing a high degree of contact between the element 444 and groove 428. In certain embodiments, the element 444 has other profiles, for example a cylinder with a rounded nose. In certain embodiments, the element 444 comprises a moving aspect, for example a roller that makes rolling contact with the groove 428. In certain embodiments, the collar 440 comprises a spring element 446 that is configured to urge the element 444 toward the drive rod 420. While shown in FIG. 6A as a coil spring, spring element 46 may be of any construction or material.

In certain embodiments, the cartridge positioning system 410 is configured such that a compartment 312 is aligned with the carrier mount 430, which allows a carrier 340 to be moved from a compartment 312 to the carrier mount 430, when the element 444 is engaged within a second portion 427 of the groove 428. This allows a range of the rotational position of drive rod 430 within which the compartment 312 remains aligned with the carrier mount 430. In certain embodiments, a full rotation of the drive rods 430 of system 410 will align an adjacent compartment 312 of the cartridge 310 with the carrier mount 430. In certain embodiments, an integer number of full rotations of the drive rods 430 of system 410 will align an adjacent compartment 312 of the cartridge 310 with the carrier mount 430.

FIG. 6B depicts a portion of drive rod 420 and collar 440 while a force F is being applied to the collar 440 in a direction parallel to axis 422. If the force F is greater than or equal to the threshold value, the element 444 retracts and passes from groove 428B over the separation ridge 429 to groove 428A (which may be different portions of a single groove in certain embodiments). In certain embodiments, the element 444 moves along an axis 423 that is perpendicular to the axis 422. If the force F is less than the threshold value, element 444 remains engaged with the groove 428B.

FIGS. 7A-7D depict an exemplary sequence of operations of the slide handling system 400 of FIG. 4, according to the present disclosure.

Figure 7A:
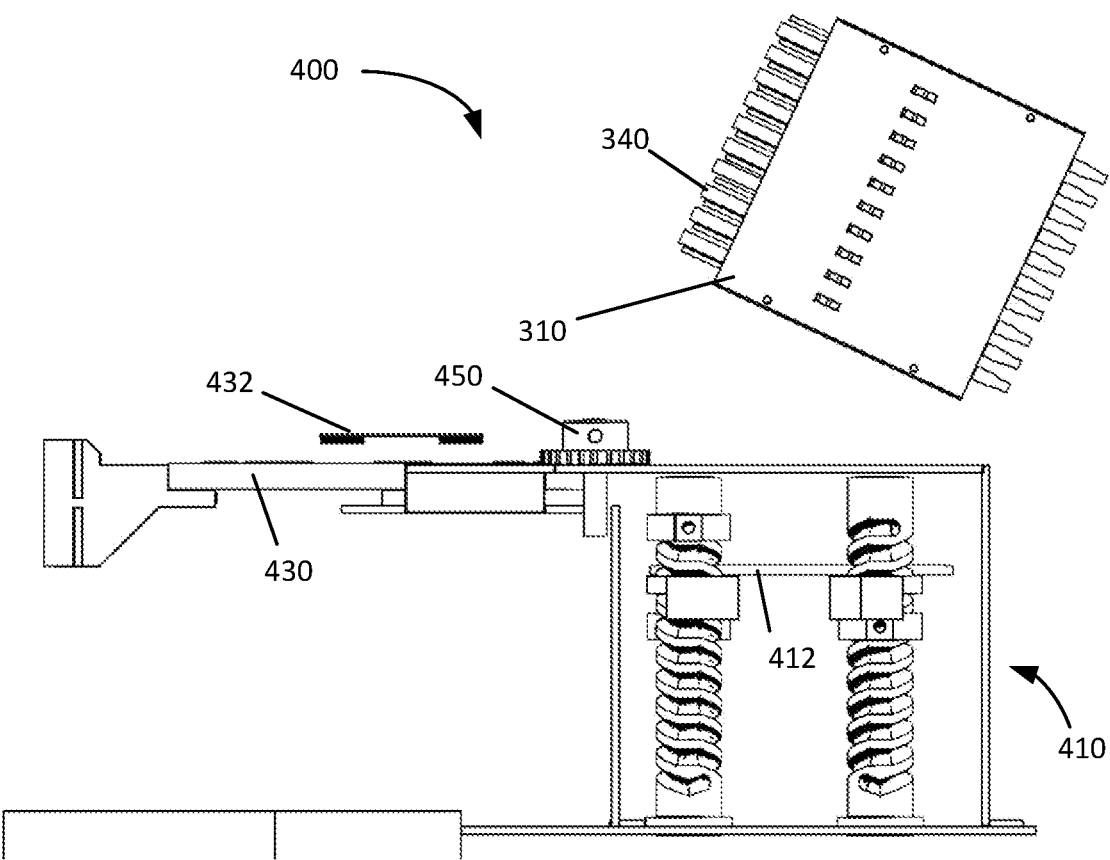
FIGS. 7A-7D depict an exemplary sequence of operations of the cartridge positioning system of FIG. 4, according to the present disclosure.

FIG. 7A depicts a cartridge 310 being loaded onto the platform 412 of the cartridge positioning system 410. The cartridge 310, in this example, contains a plurality of carriers 340. The carrier mount 430, with the associated slide clamp 432, is shown in a loading position. Actuator 450 is shown positioned proximate to the loading position of the carrier mount 430.

Figure 7B:
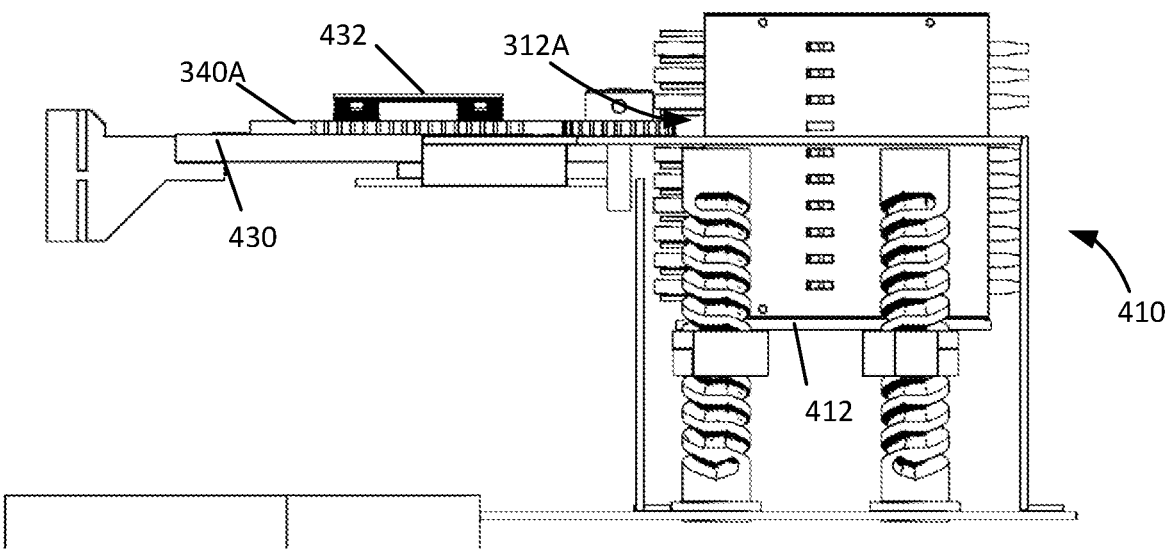

FIG. 7B shows the cartridge 310 accepted by the platform 412 and the cartridge positioning system 410 activated to place compartment 312A in alignment with the carrier mount 430. A carrier 340A has been removed from compartment 312A of the cartridge 310 and accepted by the carrier mount 430, including activation of the slide clamp 432 to move downward and clamp a slide (not visible in FIG. 7B) carried by carrier 340A against a stop (not visible in FIG. 7B) of the carrier mount 430. The function of slide clamp 432 is discussed further with respect to FIGS. 11A-11B.

Figure 7C:
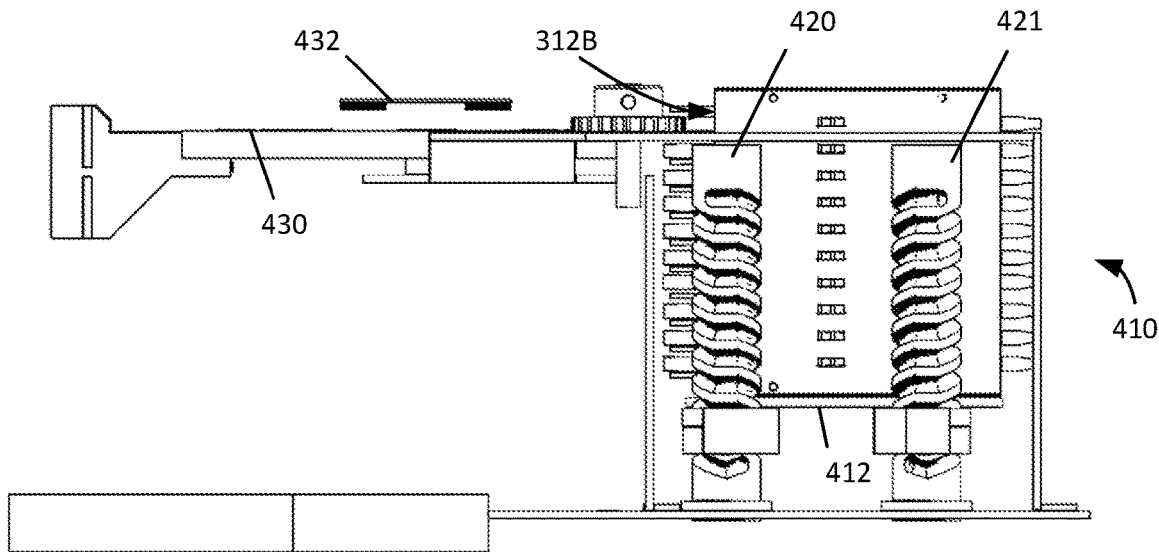

FIG. 7C depicts the cartridge positioning system 410 activated to move platform 412 so as to position a second compartment 312B, in this example the top compartment of cartridge 310, in alignment with carrier mount 430. Carrier 430A was, in this example, inserted into compartment 312A from the configuration of FIG. 7B prior to the activation of the cartridge positioning system 410. This activation comprises rotation of drive rods 420 and 421 in opposite directions.

Figure 7D:
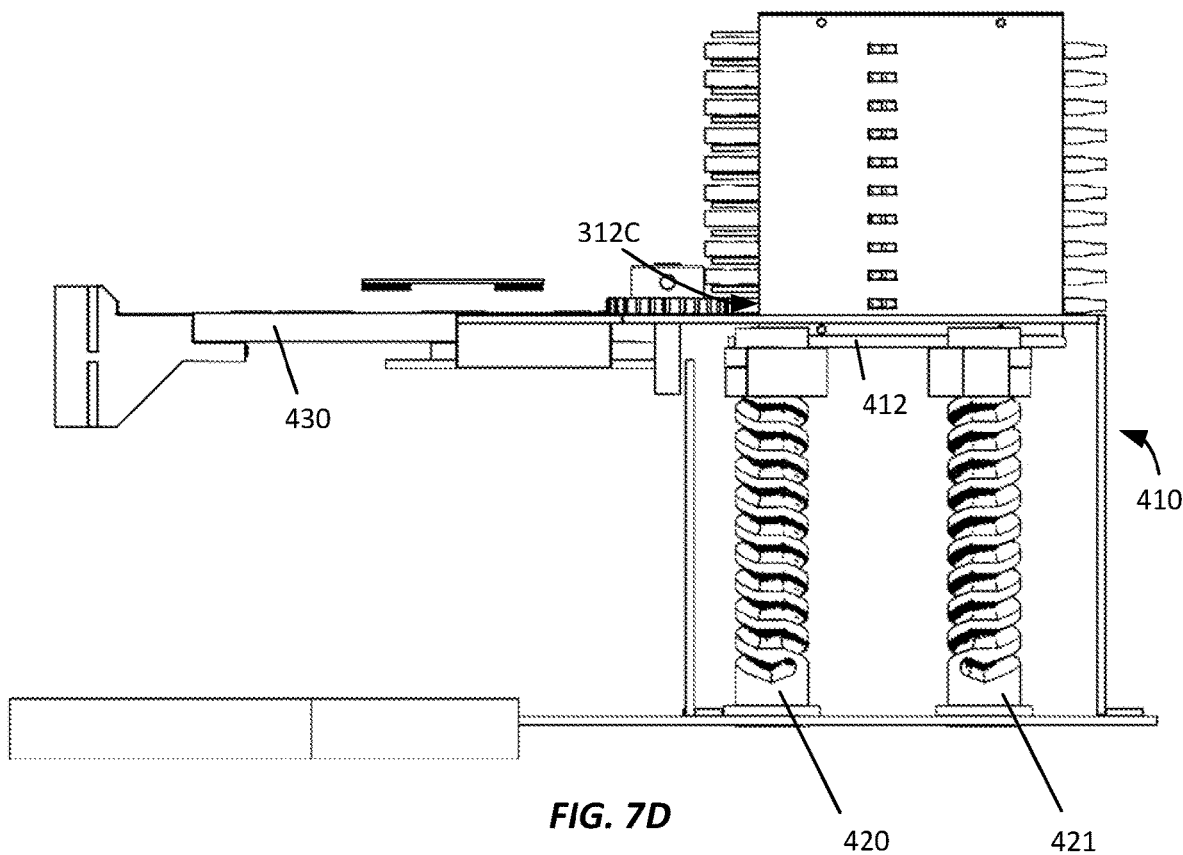

FIG. 7D depicts the cartridge positioning system 410 activated to move platform 412 so as to position a third compartment 312C, in this example the bottom compartment of cartridge 310, in alignment with carrier mount 430.

FIGS. 8A-8G depict an exemplary sequence of operations of the cartridge positioning system 410 for removing a carrier 340 from a cartridge 310, according to the present disclosure.

Figure 8A:
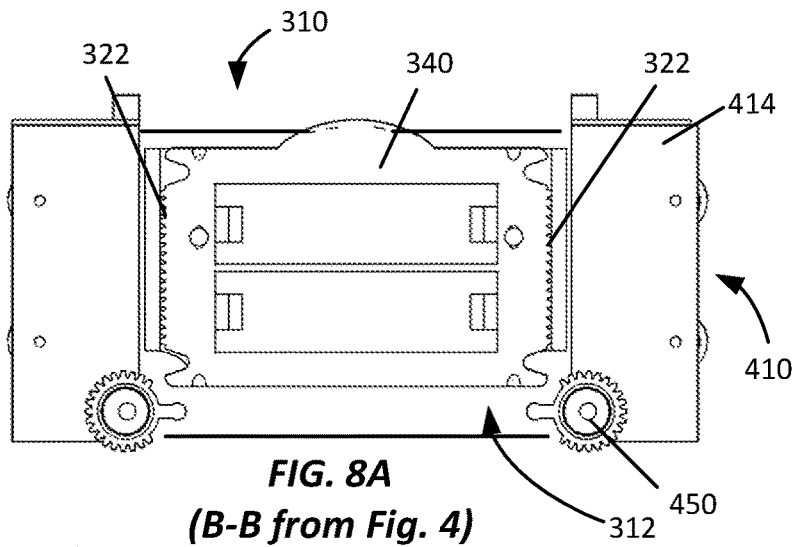
FIGS. 8A-8G depict an exemplary sequence of operations of the carrier handling subsystem for removing a carrier from the cartridge, according to the present disclosure.

FIG. 8A is a plan view of a cut-away as indicated by section C-C in FIG. 4, with certain elements omitted for clarity. A carrier 340 is position in a "seated" position within a compartment 312 between sidewalls 322 of a cartridge 310. An actuator 450 is attached to structure 414 at a corner of the compartment 312. The actuator 450 is vertically clear of the cartridge 310 such that the cartridge positioning system 410 can raise and lower the cartridge 310 without striking the actuator 450. In this example sequence, the actuator 450 is shown in a "9 o'clock" position in FIG. 8A.

FIGS. 8B-8F are a portion of the view of FIG. 8A.

Figure 8B:
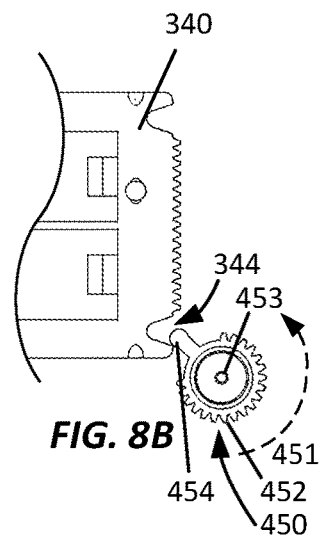

FIG. 8B shows the configuration of cartridge positioning system 410 after counterclockwise rotation of the actuator 450, as indicated by the arrow 451, to an approximately "10 o'clock" position. The actuator 450 is configured to rotate about a center 453 and comprises a rotary engagement feature 452 and a tab 454. In certain embodiments, the rotary engagement feature 452 comprises gear teeth. In certain embodiments, the rotary engagement feature 452 may comprise an alternate profile and material, for example a rubber drive wheel, while the linear engagement feature 322 may comprise a mating feature, for example a flat textured surface providing a non-slip surface for a rubber wheel. In certain embodiments, the gear teeth of the rotary engagement feature 452 are configured to mate with gear teeth of the linear engagement feature 346. In certain embodiments, the gear teeth of the rotary engagement feature 452 have a pitch in the range of 2-20 teeth per inch, 3-10 teeth per inch, 4-8 teeth per inch, or 5-6 teeth per inch. In FIG. 8B, the tab 454 of the actuator 450 is in contact with a surface of the notch 344 that is formed in the body of carrier 340.

Figure 8C:
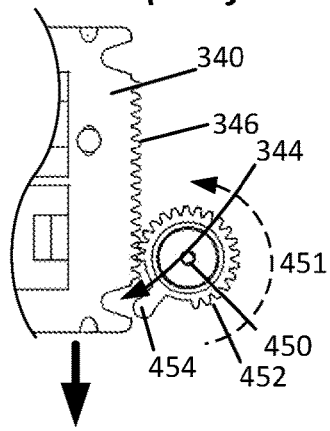

FIG. 8C shows the configuration of cartridge positioning system 410 after further counterclockwise rotation of the actuator 450, as indicated by the arrow 451, to an approximately "8 o'clock" position. The carrier 340 has been moved toward the carrier mount (not shown in FIGS. 8A-8G) by the motion of the actuator 450 and the rotary engagement feature 452 of the actuator 450 has engaged the linear actuation feature 346 of the carrier 340.

Figure 8D:
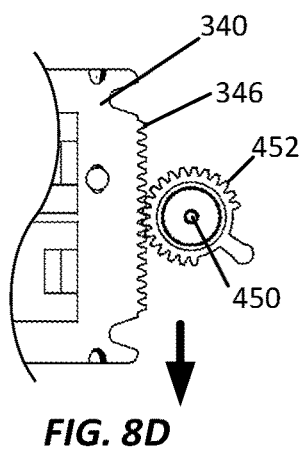

FIG. 8D shows the configuration of cartridge positioning system 410 after further counterclockwise rotation of the actuator 450 to an approximately "4 o'clock" position. The rotation of the actuator 450, through the engagement of the rotary engagement feature 452 with the linear engagement feature 352, has moved the carrier 340 further toward the carrier mount.

Figure 8E:
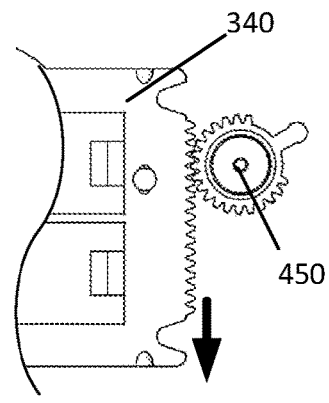

FIG. 8E shows the configuration of cartridge positioning system 410 after further counterclockwise rotation of the actuator 450 to an approximately "2 o'clock" position, which has further moved carrier 340 toward the carrier mount.

Figure 8F:
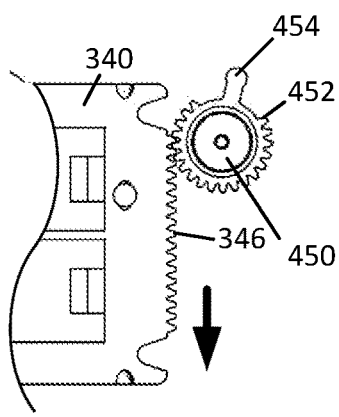

FIG. 8F shows the configuration of cartridge positioning system 410 after further counterclockwise rotation of the actuator 450 to an approximately "1 o'clock" position, which has further moved carrier 340 toward the carrier mount. The rotary engagement feature 452 has reached an end of the linear engagement feature 346 and the tab 454 extends beyond the "back" surface of the carrier 340.

Figure 8G:
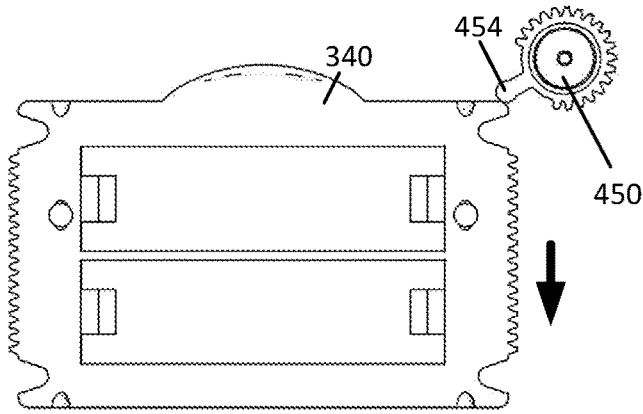

FIG. 8G shows the configuration of cartridge positioning system 410 after further counterclockwise rotation of the actuator 450 to an approximately "8 o'clock" position, whereupon the tab 454 has been pushing on the back surface of the carrier 340 since passing approximately the "10 o'clock" position, which has further moved carrier 340 toward the carrier mount and, in the configuration shown in FIG. 8G, into an "accepted" position of the carrier 340 in the carrier mount. The carrier mount is now able to move the carrier 340 into a viewing position of a system such as the slide examination system 100 shown in FIG. 1.

FIGS. 9A-9F depict an exemplary sequence of operations of the cartridge positioning system 410 for inserting a carrier 340 into a cartridge 310, according to the present disclosure.

Figure 9A:
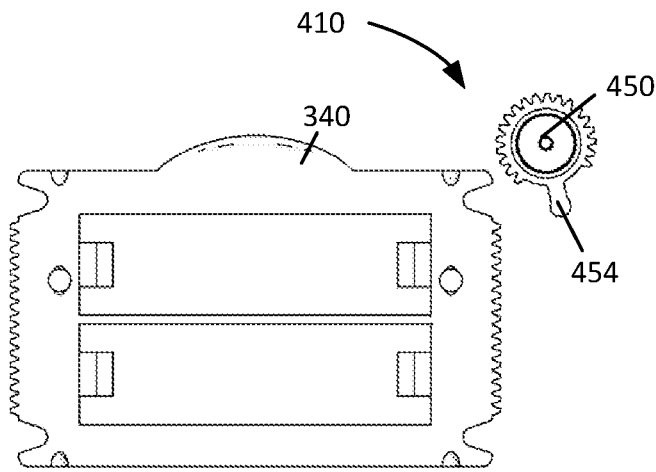
FIGS. 9A-9F depict an exemplary sequence of operations of the carrier handling subsystem for inserting a carrier into the cartridge, according to the present disclosure.

FIG. 9A shows the cartridge positioning system 410 in the initial configuration when carrier 340 is presented for unloading by the carrier mount (omitted in FIGS. 9A-9F for clarity). The actuator 450 is shown in a "5 o'clock" position that positions the tab 454 clear of the carrier 340.

FIGS. 9B-9E are a portion of the view of FIG. 9A.

Figure 9B:
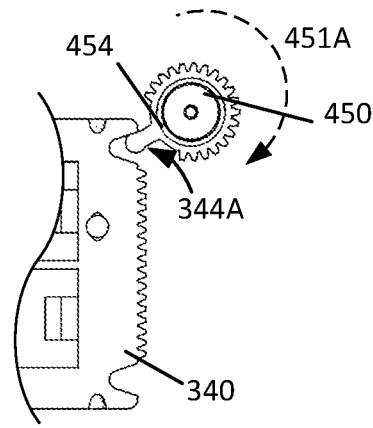

FIG. 9B shows the configuration of cartridge positioning system 410 after clockwise rotation of the actuator 450, as indicated by the arrow 451A, to an approximately "8 o'clock" position wherein the tab 454 of the actuator 450 is in contact with a surface of the notch 344A.

Figure 9C:
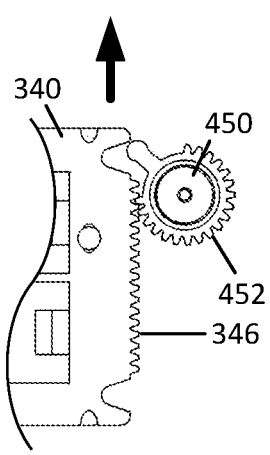

FIG. 9C shows the configuration of cartridge positioning system 410 after further clockwise rotation of the actuator 450 to an approximately "10 o'clock" position. The rotary engagement feature 452 of the actuator 450 has engaged the linear actuation feature 346 of the carrier 340. The carrier 340 has been moved into the compartment 312 of cartridge 310 (not shown for clarity) by the motion of the actuator 450.

Figure 9D:
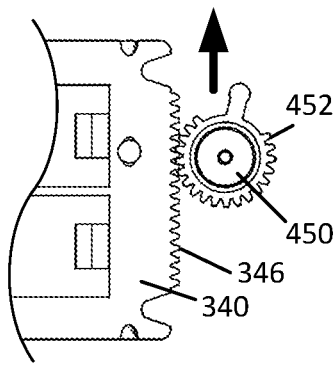

FIG. 9D shows the configuration of cartridge positioning system 410 after further clockwise rotation of the actuator 450 to an approximately "1 o'clock" position. This rotation while the rotary engagement feature 452 is engaged with the linear engagement feature 346 of the slide carrier 340 has caused the slide carrier 340 to be moved further into the compartment 312 by the motion of the actuator 450.

Figure 9E:
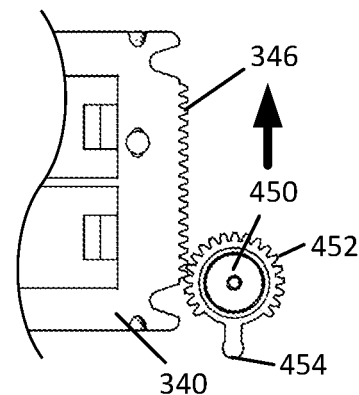

FIG. 9E shows the configuration of cartridge positioning system 410 after further clockwise rotation of the actuator 450 to an approximately "6 o'clock" position. The carrier 340 has been moved further into the compartment 312 by the motion of the actuator 450. The rotary engagement feature 452 has reached an end of the linear engagement feature 346 and the tab 454 extends beyond the "front" surface of the carrier 340.

Figure 9F:
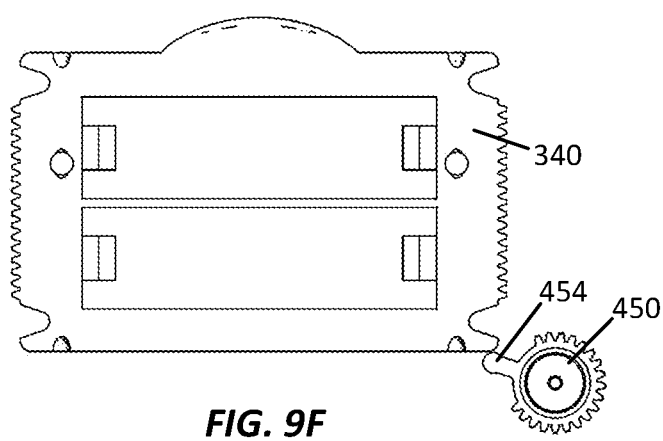

FIG. 9F shows the configuration of cartridge positioning system 410 after further clockwise rotation of the actuator 450 to an approximately "10 o'clock" position, whereupon the tab 454 has been pushing on the front surface of the slide carrier 340 since passing approximately the "7 o'clock" position, which has further moved slide carrier 340 into the compartment 312 and, in the configuration shown in FIG. 9F, into the "seated" position of the carrier 340 in the cartridge 310. The cartridge positioning system 410 is now able to move the cartridge 310 into a new position such as shown in FIGS. 7C-7D.

Figure 10A:
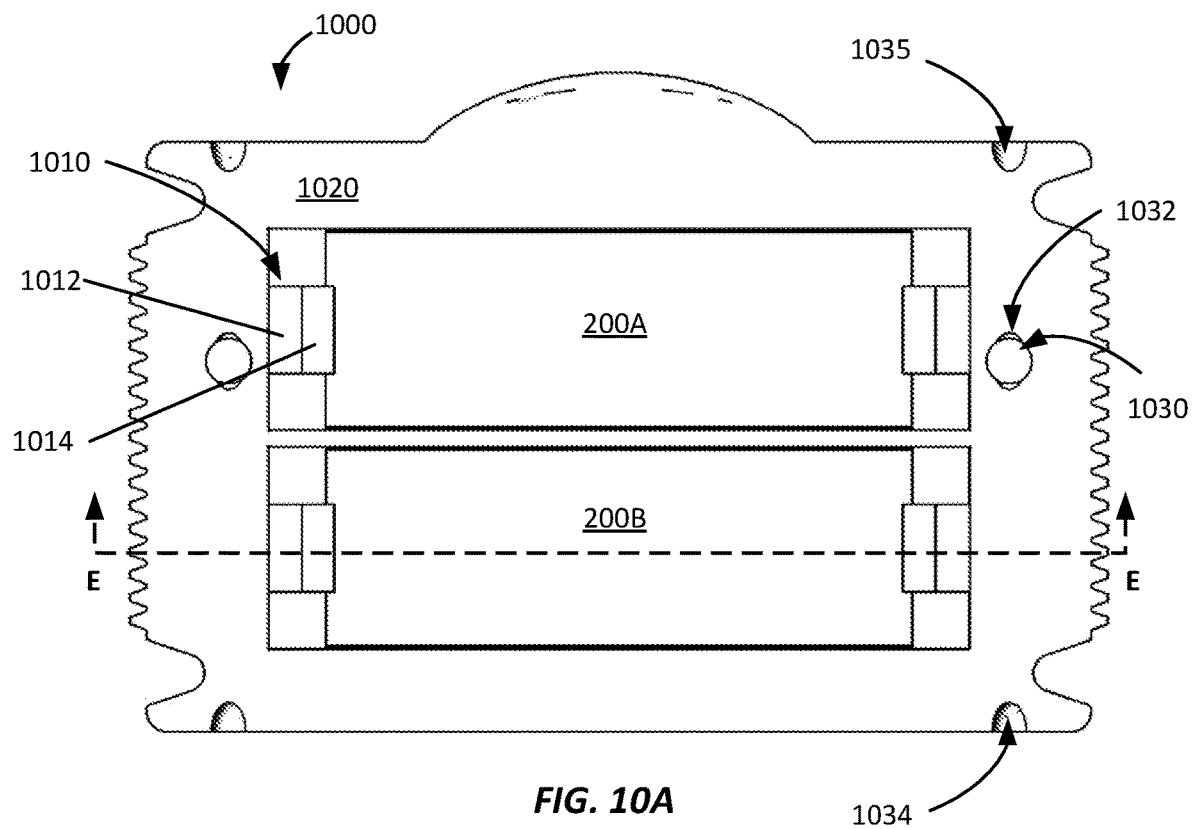
FIGS. 10A-10C depict an exemplary carrier, according to the present disclosure.

FIG. 10A is a plan view of the top surface of an exemplary slide carrier 1000, according to the present disclosure. Tabs 1010 are coupled to the body 1020 of the carrier 1000 and configured to removably couple to slides 200, shown as slides 200A and 200B in the two slide mounting areas of the example carrier 1000. Each tab 1010 comprises a gripper portion 1014 and a flexible portion 1012. The carrier 1000 also comprises a retention hole 1032 that, in this example, has entry ramps 1032. In certain embodiments, the retention hole 1032 is a circular through hole. The carrier 1000 also comprises a front-entry ramp 1034 and a back-entry ramp 1035 on the top surface of the body 1020.

Figure 10B:
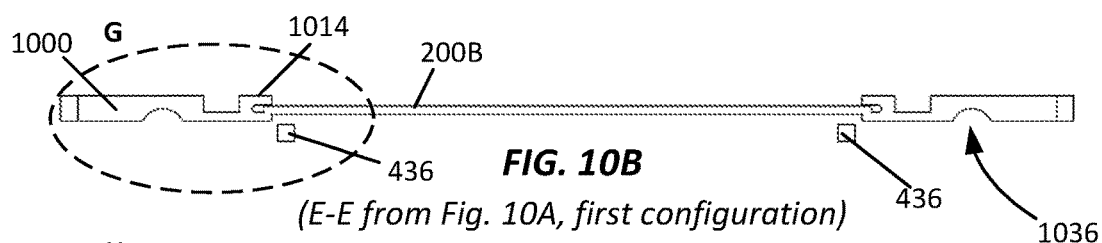
Figure 10C:
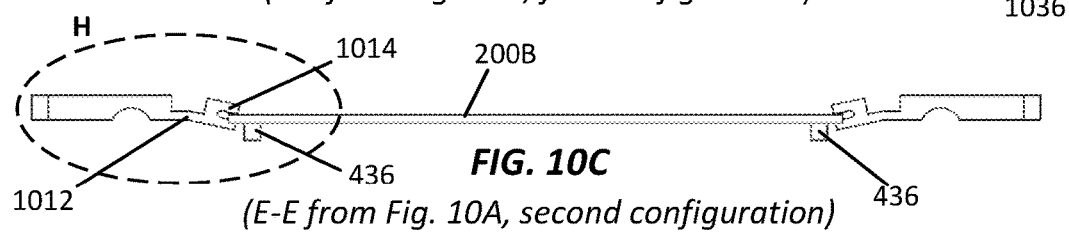

FIGS. 10B-10C are cross-section views of carrier 1000 of FIG. 10A.

FIG. 10B depicts the carrier 1000 in a first configuration that is representative of the carrier 1000 as first loaded into a carrier mount (most of which has been omitted for clarity). The slide 200B is separately from the stops 436 of the carrier mount to allow movement of the carrier 1000 relative to the carrier mount.

FIG. 10C depicts the carrier 1000 in a second position wherein the slide 200B has been vertically displaced to contact the stops 436. This contact positions the slide in a known vertical position to enable a system, such as the slide positioning system of FIG. 1, to precisely position the slide 200B.

Figure 11A:
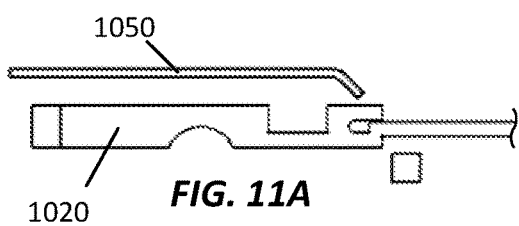
FIGS. 11A-11B depict an exemplary actuation arm, according to the present disclosure.
Figure 11B:
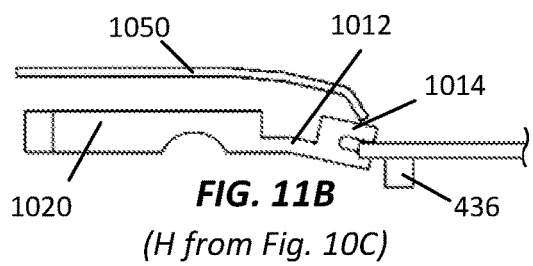

FIGS. 11A-11B depict an exemplary actuation finger 1050, according to the present disclosure. FIG. 11A shows the actuation finger 1050 as configured while the carrier 1000 is in the first configuration of FIG. 10B. In certain embodiments, this configuration of the actuator finger 1050 is determined by a first position of the finger-actuation slide 434 of FIG. 4 (not shown in FIG. 11A).

FIG. 11B shows the actuation finger 1050 as configured while the carrier 1000 is in the second configuration of FIG. 10C. In certain embodiments, this configuration of the actuator finger 1050 is determined by a second position of the finger-actuation slide 434. In certain embodiments, the tip of finger 1050 contacts the gripper 1014 and moves the gripper 1014 downward until slide 200B contacts the stop 436. In certain embodiments, the finger 1050 continues to apply a determined force to hold the slide 200B against the stop 436 during operation of the slide positions system 100.

FIGS. 12A-12F depict cut-away views of an exemplary carrier locking system 1200, according to the present disclosure.

Figure 12A:
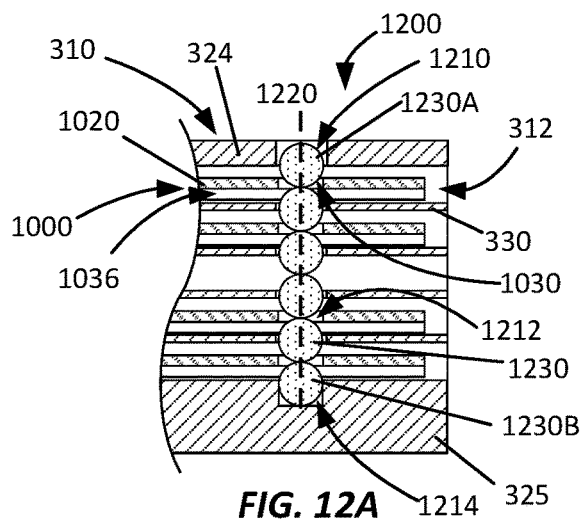
FIGS. 12A-12E depict cut-away views of an exemplary carrier locking system, according to the present disclosure.

FIG. 12A depicts an example system 1200 comprising a cartridge 310 having five compartments 312 with carriers 1000 disposed within four of the compartments 312. In this view, the groove 1036 formed on the bottom surface of body 1020 of the carrier 100 is visible. The locking system 1200 comprises guide hole 1210 in top plate 324, guide hole 1214 in bottom plate 325, and guide holes 1212 in each of the separators 330. In certain embodiments, the guide holes 1210, 1212, and 1214 are disposed on an axis 1220. In certain embodiments, the axis 1220 is generally perpendicular to the plane of the compartments 312.

In general, the locking system 1200 is configured to allow separations between the spacers 1230 wherein the total of the separations is more than one and less than two times the remaining thickness of a slide carrier body 1020 after subtracting the depth of the groove 1036. The effect of this limitation is that any slide carrier 1000 in a cartridge 310 can be with withdrawn but a second slide carrier 1000 cannot be displaced from its seated position while the first slide carrier 1000 is still partially inserted within the cartridge 310.

The guide system 1200 comprises a plurality of spacers 1230 (including spacers 1230A and 1230B) disposed generally within one or more of the guide holes 1210, 1212, and 1214. In certain embodiments, the spacers 1230 (including top spacer 1230A and bottom spacer 1230B) are all identical and have a height. In certain embodiments, the spacers 1230 are approximately spheres having a height that is the same as the diameter of the sphere. In certain embodiments, the spacers 1230 comprise one of more of a metal, a ceramic, a plastic or other polymeric material, a glass, or any other solid material. In certain embodiments, the spacers 1230 comprise a coating or surface treatment, for example a friction-reducing material such as polytetrafluoroethylene (PTFE) or a wear-reducing treatment such as anodization. A portion of the spacers 1230 can move along axis 1220. In certain embodiments, the bottom spacer 1230B is fixed in guide hole 1214. In certain embodiments, the height of spacer 1230A and/or 1230B are different from the spacers 1230 disposed between spacers 1230A and 1230B. In certain embodiments, the configuration of the spacers 1230 may differ within a locking system 1200.

A carrier 1000 that is disposed such that its retention hole 1030 is disposed on axis 1220 is in a "seated" position. With the four carriers 1000 in their respective seated positions as shown in FIG. 12A, adjacent spacers 1230 are in contact with each other. In certain embodiments, guide hole 1214 is configured as a pocket having a depth that is less than the height of spacer 1230B. In certain embodiments, guide hole 1214 has a depth that is approximately half the height of spacer 1230B such that approximately half the spacer 1230B protrudes in the lowest compartment.

In certain embodiments, the thickness of a separator 330 and the height of a compartment 312 are in the range of 50%-150% of the height of a spacer 1230. In certain embodiments, the thickness of a separator 330 and the height of a compartment 312 are in the range of 75%-125% of the height of a spacer 1230. In certain embodiments, the thickness of a separator 330 and the height of a compartment 312 are in the range of 90%-110% of the height of a spacer 1230. In certain embodiments, the thickness of a separator 330 and the height of a compartment 312 are approximately equal to the height of a spacer 1230.

Figure 12B:
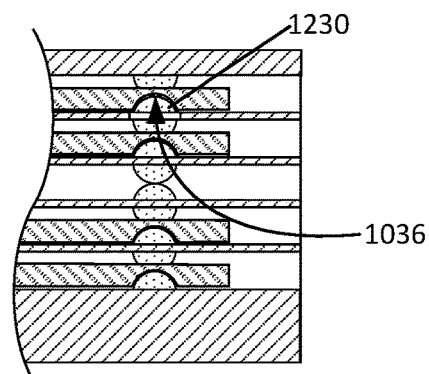

FIG. 12B is a view from the "front" of the cartridge 310, showing how the spacers 1230 ride within the groove 1036.

Figure 12C:
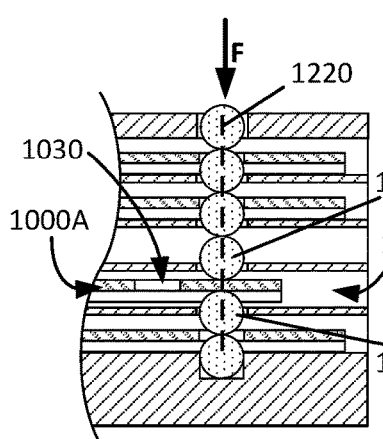

FIG. 12C depicts the configuration of system 1200 while a carrier 1000A is partially removed from a compartment 312, i.e. the body 1020 is still interposed between adjacent spacers 1230 but the retention hole 1030 is not disposed on axis 1220. Spacer 1230D, disposed under the carrier 1000A, rides in groove 1036 while spacer 1230C, disposed above the carrier 1000A, rides on the top surface of the body 1020. The spacers 1230 that are above the carrier 1000A are displaced upward by the thickness of the carrier above the groove 1036. In certain embodiments, a spring (not shown in FIG. 12C for clarity) applies a bias force F is provided in a downward direction to maintain the spacers 1230 in contact with the objects, carriers 1000 or other spacers 1230, above and below them. In certain embodiments, this bias force F is partially provided by the weight of the spacers themselves.

While the carrier locking system 1200 is configured as shown in FIG. 12C, with a carrier 1000 partially removed from the compartment 312, removal of other carriers 1000 from other compartments 312 is prevented by the displaced position of the spacers 1230 each substantially blocking a compartment 312, for compartments above the partially removed carrier 1000, and by the inability of the spacers 1230 of compartments 312 below the carrier 1000 to move at all. In certain embodiments, the displaced spacers 1230 are approximately centered in the height of the proximate compartments 312.

In certain embodiments, guide hole 1210 is configured as a pocket having a depth that is sufficient to allow spacer 1230A to move upwards while a single carrier 1000 is partially removed but insufficient to allow two carriers to simultaneously be partially removed. In certain embodiments, this limitation on upward motion of the spacer 1230A is provided by a travel limiting feature (not shown in FIG. 12C) that is coupled to the top plate 324.

Figure 12D:
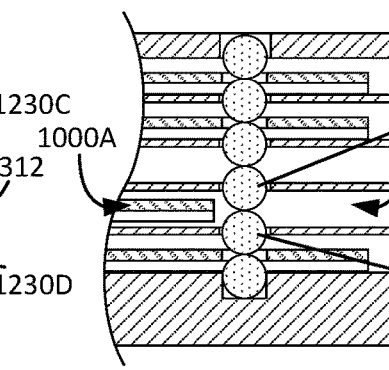

FIG. 12D depicts the configuration of the carrier locking system 1200 after carrier 1000A is "fully removed," i.e. the body of carrier 1000A is not interposed between spacers 1230C and 1230D. Spacer 1230C and all the other spacers 1230 above 1230C have moved downward such that spacers 1230C and 1203D are in direct contact. Now that the carrier 1000A is fully removed, any other seated carrier 1000 can be removed, or a new carrier 1000 can be inserted into an open compartment 312.

Figure 12E:
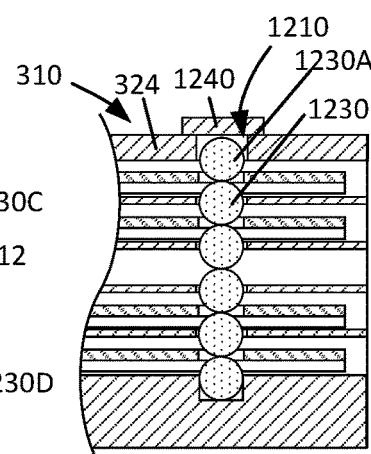

FIG. 12E depicts the configuration of the carrier locking system 1200 when a locking feature 1240 that is movably coupled to the top plate 324. The locking feature 1240 has an unlocked position that allows a carrier 1000 to be withdrawn from the cartridge 310 and a locked position that prevents any carrier 1000 from being withdrawn from any compartment 312 of the cartridge 312. FIG. 12E depicts an example locking feature 1240 as a plate that has been moved to cover the guide hole 1210, wherein the thickness of top plate 324 is such that the top spacer 1230A must protrude above the top surface of the top plate 324 while a carrier 1000 is partially removed, as shown in FIG. 12C. The position of locking feature 1240 in FIG. 12E is an exemplary locked position. Preventing the spacer 1230A from protruding locks all the lower spacers 1230 in place and thereby prevents a carrier 1000 from being able to be removed.

While the invention has been described with reference to particular aspects, it will be understood by those skilled in the art that various changes may be made and equivalents may be substituted for elements thereof without departing from the scope of the invention. In addition, many modifications may be made to a particular situation or material to the teachings of the invention without departing from the scope of the invention. Therefore, it is intended that the invention not be limited to the particular aspects disclosed but that the invention will include all aspects falling within the scope and spirit of the appended claims.

We claim:

1. A system for handling slides, the system comprising:
   a carrier comprising a linear engagement feature and a notch,
   a cartridge having a compartment configured to accept the carrier, and
   a cartridge positioning system comprising:
   a structure,
   a platform movable coupled to the structure and configured to accept the cartridge, and
   an actuator movably coupled to the structure, the actuator comprising a rotary engagement feature configured to engage the linear engagement feature and a tab configured to interact with the notch when the carrier is accepted into the compartment and the cartridge is accepted onto the platform, wherein:
operation of the actuator in a first direction removes the carrier from the compartment, and
operation of the actuator in a second direction opposite to the first direction inserts the carrier into the compartment.

2. The system of claim 1, wherein:
the compartment has a seated position,
operation of the actuator in a first direction extracts the carrier from the seated position, and
operation of the actuator in the second direction moves the carrier into the seated position.

3. The system of claim 2, wherein the linear engagement feature and the rotary engagement feature both comprise gear teeth.

4. A carrier for use in a slide handling system having an actuator, the carrier comprising:
a body,
a notch formed in the body, and
a linear engagement feature formed along an edge of the body,
wherein the linear engagement feature and the notch are configured to engage with the actuator so that the actuator may move the carrier.

5. The carrier of claim 4, the carrier further comprising a retention hole formed in the body.

6. The carrier of claim 4, the carrier further comprising a tab coupled to the body, the tab comprising a gripper portion and a flexible portion.

7. The carrier of claim 4, wherein the notch is disposed proximate to the linear engagement feature such that rotation of the actuator first engages the notch and moves the carrier sufficient for the actuator to engage the linear engagement feature.

* * * * *